United States Patent [19]

Lapin et al.

[11] Patent Number: 4,751,273

[45] Date of Patent: Jun. 14, 1988

[54] VINYL ETHER TERMINATED URETHANE RESINS

[75] Inventors: Stephen C. Lapin, Wauconda; David W. House, Arlington Heights, both of Ill.

[73] Assignee: Allied-Signal, Inc., Morristown, N.J.

[21] Appl. No.: 69,924

[22] Filed: Jul. 6, 1987

Related U.S. Application Data

[63] Continuation-in-part of Ser. No. 898,456, Aug. 19, 1986, abandoned.

[51] Int. Cl.$^4$ .............................................. C08L 29/10
[52] U.S. Cl. .................. 525/455; 204/157.82; 526/301; 528/49; 528/58; 528/75; 560/24; 560/25; 560/26; 560/115; 560/157; 560/158; 560/166

[58] Field of Search ...................... 525/455; 526/301; 528/49, 75, 58; 560/24, 25, 26, 115, 157, 158, 166; 204/157.82

[56] References Cited

U.S. PATENT DOCUMENTS 3,928,287 12/1987 Jellinek et al. .................... 560/26

*Primary Examiner*—Maurice J. Welsh
*Attorney, Agent, or Firm*—Thomas K. McBride; John F. Spears, Jr.; Raymond H. Nelson

[57] ABSTRACT

Vinyl ether terminated urethane resins may be prepared by reacting the product obtained by the addition of acetylene to an organic polyol with an isocyanate-containing compound at temperatures ranging from about ambient to about 125° C. The thus prepared resin may then be cured by irradiation from an electron beam, thermally or by exposure to an ultraviolet light to cure the resin and form a coating material.

35 Claims, No Drawings

VINYL ETHER TERMINATED URETHANE RESINS

CROSS-REFERENCE TO RELATED APPLICATION

This application is a Continuation-in-Part of copending application Ser. No. 898,456 filed Aug. 19, 1986 and now abandoned, all teachings of which are incorporated herein by reference thereto.

BACKGROUND OF THE INVENTION

Various types of resins will find a wide variety of uses, among which will be printing inks and coatings for the graphic arts and packaging industries. Prior resins have included acrylated urethanes. These resins are formed by the reaction of a hydroxyacrylate monomer with an isocyanate monomer or prepolymer and may be based on a wide range of aromatic and aliphatic isocyanates. Multifunctional acrylate monomers such as, for example, trimethylolpropane triacrylate, may be combined with the acrylated urethanes in order to reduce the viscosity of the resin and increase the cross-linked density of the cured material. The acrylated urethanes may be cured by a free radical polymerization of the acrylate group, this being accomplished by ultraviolet irradiation in the presence of a photoinitiator or by electron beam irradiation. The radiation-cured acrylated urethanes may be used in printing inks, floor coatings, automotive coatings, printed circuit board coatings, etc. However, the acrylates possess an inherent disadvantage in that the monomers are known to be toxic whereby a hazard to the general health of either the user or the public at large is created.

Vinyl ethers constitute extremely reactive monomers which are known to polymerize by a cationic mechanism. These compounds may be useful in applications which require a high speed curing of a resin formulation. The vinyl ethers react much faster than the epoxy resins and therefore may be used for printing inks, coatings, elastomers, foams, or in other types of materials dependent upon the ability of the resin to cure at a rate which is contiguous with other processing steps. One disadvantage which is attendant to the vinyl ethers is that the commercial availability of these ethers is relatively limited. In general, the vinyl ethers which are available constitute low molecular weight monofunctional or difunctional monomers. However, in most commercial applications, the use of higher molecular weight polymer resins constitutes the preferred species. This is due to the fact that the higher mole weight materials are non-volatile and will possess more desirable rheological properties, and they permit greater control of the properties of the finished product.

As will hereinafter be shown in greater detail, it has now been discovered that it is possible to obtain vinyl ether terminated urethane resins which will constitute novel compositions of matter and which will possess characteristics which make them desirable for use in various commercial applications.

The aforesaid vinyl ether terminated urethane resins which are formed by the process hereinafter described in greater detail may be subjected to a curing treatment to provide tack-free coatings.

BRIEF SUMMARY OF THE INVENTION

This application relates to novel compositions of matter comprising vinyl ether terminated urethane resins. More specifically, the invention is concerned with these novel compositions of matter and also to a process for preparing these products. In addition, the invention is also concerned with a process for subjecting these novel compositions of matter to a curing treatment whereby a finished product comprising a tack-free coating may be obtained therefrom.

It is therefore an object of this invention to provide novel compositions of matter comprising certain resins which may be utilized in various commercial applications.

A further object of this invention is to provide a process for preparing vinyl ether terminated urethane resins which are utilized for coatings of various and sundry kinds.

In one aspect, an embodiment of this invention resides in a vinyl ether terminated urethane resin having the generic formula:

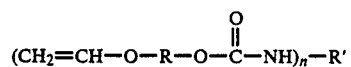

in which R and R' are independently selected from the group consisting of alkyl, aryl, alkaryl, aralkyl, cycloalkyl and alkyl oxide radicals and n is an integer of from 1 to 4.

Another embodiment of this invention is found in a process for the preparation of a vinyl ether terminated urethane resin which comprises reacting the product obtained by the addition of acetylene to an organic polyol with an isocyanate-containing compound at reaction conditions, and recovering the resultant vinyl ether terminated urethane resin.

A specific embodiment of this invention resides in a vinyl terminated urethane resin having the generic formula:

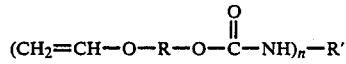

in which R comprises methylene and R' comprises dicyclohexylmethyl.

Another specific embodiment of this invention is found in a process for the preparation of a vinyl ether terminated urethane resin which comprises reacting the product obtained by the addition of acetylene to triethylene glycol with 2,4-toluene diisocyanate at a temperature in the range of from about ambient to about 125° C. and about atmospheric pressure in the presence of a tin-containing catalyst comprising dibutyltin dilaurate and recovering the resultant vinyl ether terminated urethane resin.

In addition, another embodiment of this invention is found in a polymeric material that results from curing a vinyl ether terminated resin having the generic formula:

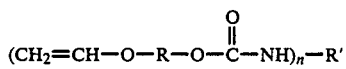

in which R and R' are independently selected from the group consisting of alkyl, aryl, alkaryl, aralkyl, cycloalkyl and alkyl oxide radicals and n is an integer of from 1 to 4 which has been polymerized by a curing treatment at curing conditions.

Yet another embodiment of this invention resides in a method for obtaining a tack-free coating which comprises subjecting a vinyl ether terminated urethane resin having the generic formula:

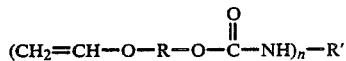

in which R and R' are independently selected from the group consisting of alkyl, aryl, alkaryl, aralkyl, cycloalkyl and alkyl oxide radicals and n is an integer of from 1 to 4 to a curing treatment at curing conditions, and recovering the resultant tack-free coating.

Other objects and embodiments will be found in the following further detailed description of the invention.

DETAILED DESCRIPTION OF THE INVENTION

As hereinbefore set forth, the present invention is concerned with novel compositions of matter comprising vinyl ether terminated urethane resins and to a process for the preparation thereof. In addition, the novel compositions of matter may be subjected to a curing reaction or treatment whereby the resins will polymerize to produce a coating which is solid and tack-free. The desired resins may be prepared by the reaction of a hydroxy vinyl ether with a multifunctional isocyanate monomer or prepolymer. The hydroxy vinyl ether which is utilized as one component to form the novel composition of matter of the present invention may be prepared by the base catalyzed reaction of acetylene with polyols. The process may be exemplified by the following equation in which a diol is reacted with acetylene at an elevated temperature and pressure in the presence of a basic catalyst which, in the reaction, is represented by potassium hydroxide:

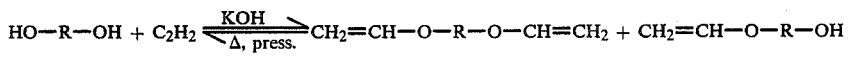

In the above equation, R may be selected from the group consisting of alkyl, aryl, alkaryl, aralkyl, cycloalkyl and alkyl oxide radicals. The reaction conditions which may be employed to effect this acetylene reaction will include temperatures in the range of from about 120° C. to about 300° C. and a pressure in the range of from about atmospheric up to about 100 atmospheres. Other basic catalysts which may be employed to effect this reaction will include such compounds as sodium hydroxide, lithium hydroxide, calcium hydroxide, magnesium hydroxide, strontium hydroxide, etc. The reaction product which is obtained by this process will comprise a divinyl ether and a hydroxy vinyl ether. If so desired, the product may be separated by fractional distillation inasmuch as the divinyl ether product possesses a boiling point lower than the starting polyol and the hydroxy vinyl ether. In addition, the basic catalyst is also separated from the product inasmuch as the presence of such a compound in the finished resin would inhibit the subsequent polymerization.

Examples of polyols which may be subjected to acetylation will include 1,2-ethanediol, 1,3-propanediol, 1,4-butanediol, 1,5-pentanediol, 1,6-hexanediol, diethylene glycol, triethylene glycol, dipropylene glycol, tripropylene glycol, 1,3-cyclopentanediol, 1,4-cyclohexanediol, trimethylol propane, pentaerythritol, 1,4-cyclohexane dimethanol, tris(2-hydroxyethyl) trimethylol propane, 1,4-bis(2-hydroxyethyl) phenyl ether, 1,2-bis(2-hydroxyethyl) phenyl ether, 1,3-bis(2-hydroxyethyl) phenyl ether, bis(2-hydroxyethyl)bisphenol-A, etc.

It is to be understood that the abovementioned polyols are only representative of the class of compounds which may be employed in the present invention and that the invention is not necessarily limited thereto.

The product obtained by the reaction of acetylene with the polyol will subsequently be reacted with an isocyanate-containing compound which may comprise either an isocyanate monomer or an isocyanate prepolymer. The reaction between the product obtained by the addition of acetylene to an organic polyol and the isocyanate-containing compound may be effected at reaction conditions which will include a temperature in the range of from about ambient to about 125° C. and preferably at atmospheric pressure, although it is also contemplated within the scope of this invention that superatmospheric pressures ranging up to about 50 atmospheres may be employed, if so desired. When utilizing temperatures at the lower range hereinbefore set forth, that is, temperatures of about ambient, it is preferred to effect the reaction in the presence of a catalyst. A particularly preferred type of catalyst is one which contains tin and which may be exemplified by dibutyltin dilaurate. Other process variables which may be employed to effect the desired reaction and thus form the vinyl ether terminated urethane resin will include the use of an inert solvent such as methylene chloride which may be removed in a subsequent step in a vacuum.

The reaction between the acetylene addition product and the isocyanate-containing compound may be exemplified by the following reaction:

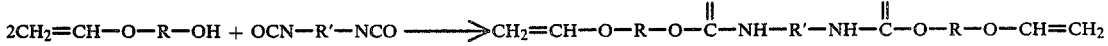

in which R' may be selected from the group consisting of alkyl, aryl, alkaryl, aralkyl, cycloalkyl and alkyl oxide radicals. In addition, R' may be monomeric or polymeric in nature. Some examples of monomeric isocyanates which may be employed in the process of the present invention will include 2,4-toluene diisocyanate, mixtures of 2,4- and 2,6-toluene diisocyanate, diphenylmethane diisocyanate, 1,2-diphenylethane diisocyanate, 1,3-diphenylpropane diisocyanate, dicyclohexylmethane diisocyanate, etc.

While the hereinbefore equation discloses the reaction between a hydroxy vinyl ether and an isocyanate-containing compound, it is also contemplated within the scope of this invention that the reaction may be effected utilizing the entire reaction product which is obtained by the reaction of acetylene with the polyol. This acetylene reaction produces a mixture of the divinyl ether, the hydroxy vinyl ether and the unreacted polyol. It is, of course, possible by utilizing fractional distillation to separate the hydroxy vinyl ether from the reaction product mixture and thus utilize only this compound in the subsequent reaction. However, it is also contemplated within the scope of this invention that the other components of the reaction product mixture, after separation of the catalyst, may be utilized and thus incorporate the divinyl ether and the unreacted polyol into the vinyl ether terminated urethane resin. The unreacted polyol such as a diol will serve to chain extend the resin inasmuch as each hydroxy group on the polyol will react with the isocyanate group and thus form a higher molecular weight material. Therefore, if the total concentration of the hydroxy group from the polyol and the hydroxy vinyl ether are known, they then may be combined with an equivalent concentration of isocyanate. Conversely, the divinyl ether will not possess any free hydroxy groups and therefore will not react with the isocyanate. However, the divinyl ether may serve as a diluent which will lower the viscosity of the mixture during the resin synthesis. Additional divinyl ethers may also be added after the synthesis of the resin has been completed in order to further adjust the viscosity of the formulation. Thus, when the resin is finally cured by means hereinafter set forth in greater detail, the additional divinyl ether which is present copolymerizes with the vinyl ether terminated urethane resin and effectively increases the cross-link density of the final product.

The process for preparing the vinyl ether terminated urethane resin may be effected in any suitable manner and may comprise either a batch or continuous type operation. For example, when a batch type operation is to be employed, the isocyanate-containing compound is placed in an appropriate apparatus and, if so desired, in the presence of an inert solvent. The hydroxy vinyl ether either in a pure state or in the presence of a divinyl ether and a polyol may be added to the isocyanate-containing compound. In the event that the reaction is to be effected at ambient or room temperatures, a catalyst of the type hereinbefore set forth may then be added. Conversely, if the reaction is to be effected at elevated temperatures, the reaction apparatus is then heated to a predetermined temperature and maintained thereat for a period of time sufficient to permit the reaction to come to its completion. Following the end of the reaction period, the desired vinyl ether terminated urethane resin is then recovered.

It is also contemplated within the scope of this invention that the reaction may be effected in a continuous manner of operation. When this type of operation is employed, the starting components of the resin are continuously charged to a reaction zone which is maintained at the proper operating conditions previously selected. After passage through the reaction zone for a predetermined time, either in the presence or absence of a catalyst and/or a solvent, the reactor effluent is continuously discharged and recovered.

In the preferred embodiment of the invention, the reactants are present in a 1:1 stoichiometry of hydroxy and isocyanate groups. However, it is also contemplated that in some instances it may be desirable to use a slight excess of hydroxy vinyl ether in order to ensure the complete reaction of the isocyanate. Conversely, it is also contemplated that an excess of isocyanate may be used to give additional cross-linking through the formation of allophanate linkages. Therefore, the ratio of hydroxy and isocyanate may vary through a range of from about 0.8:1 to about 1.2:1 moles of hydroxy vinyl ether per mole of isocyanate.

The vinyl ether terminated urethane resins which are obtained may be cured by any method known in the art to obtain the desired product. For example, the resins may be subjected to an electron beam induced curing by subjecting the resin to irradiation from an energy source such as an electron beam in which the energy dosage which is applied to the mixture is relatively low, that is, in a range of from about 0.1 to about 10.0 Mrads. The exposure to this energy may take place in the presence of an onium salt. Examples of onium salts which may be employed will include diphenyliodonium hexafluoroantimony or triphenylsulfonium hexafluorophosphate. Other methods which may also be employed to effect the curing of the resins in order to obtain the desired glossy tack-free coating will include an ultraviolet procedure in which the resin is subjected to irradiation from an ultraviolet light source which possesses a wave length of from about 1800 to about 3900 Angstroms. Such irradiation may be obtained from xenon, mercury-vapor or tungsten lamps or from various types of ultraviolet or visable lasers. The ultraviolet irradiation of the resin may be effected in the presence of an aryl-onium salt, some examples of these salts being diphenyliodonium hexafluoroantimony or triphenylsulfonium hexafluorophosphate. A third procedure which may be employed to effect the curing of the vinyl ether terminated urethane resins comprises a thermal curing in which the resin is subjected to a temperature in the range of from about ambient to about 25° C. in the presence of an organic acid or onium salt, some examples of these acids or salts comprising p-toluene sulfonic acid, methane sulfonic acid, boron trifluoride, diphenyliodonium hexafluororantimony, triphenylsulfonium hexafluorophosphate, etc.

The following examples are given to illustrate the novel vinyl ether terminated urethane resin, a method for the synthesis of these resins, the cured resins which form solid tack-free coatings and methods which are employed in this curing treatment. However, it is to be understood that these examples are given merely for purposes of illustration and that the invention is not necessarily limited thereto.

EXAMPLE I

To form a hydroxy vinyl ether, 250 milliliters of triethylene glycol, along with 7.5 grams of a catalyst comprising ground potassium hydroxide were added to a 500 mL round bottom flask equipped with a mechanical stirrer, reflux condenser and gas inlet tube. The mixture was heated to a temperature of about 19° C. while purging with nitrogen. After the temperature was stabilized, a flow of acetylene at a rate of about 1.0 liters/minute was initiated, and the reaction was allowed to continue for a period of 5 hours. The flask was fitted with a distillation head and 125 mL of reaction product was collected which had a boiling range of from 7° to 84° C. at 0.3 torr. Gas chromatographic analysis disclosed that the product comprised a mixture of 14% triethylene glycol divinyl ether, 78% triethylene glycol monovinyl ether and 7% unreacted triethylene glycol. Redistillation of the product resulted in the obtention of an 85 mL fraction which contained 95% triethylene glycol monovinyl ether.

EXAMPLE II

To form the desired vinyl ether terminated urethane resin, 3.55 g (0.014 mole) of diphenylmethane diisocyanate were dissolved in 20 mL of dry methylene chloride under a nitrogen atmosphere. Following this, 5.0 g (0.028 mole) of triethylene glycol monovinyl ether were added to the solution along with 0.01 g of dibutyltin dilaurate. The reaction apparatus became warm after a few minutes of stirring the mixture. At the end of 5 hours the solvent was removed in a vacuum and the resulting thick liquid product was recovered.

EXAMPLE III

In this example a 2:1 mole ratio of triethylene glycol monovinyl ether to 2,4-toluene diisocyanate was stirred under an atmosphere of dry nitrogen at room temperature in the presence of 0.1% dibutyltin dilaurate for a period of 5 hours. At the end of this period, the solvent was removed in a vacuum and the resulting thick, clear liquid product comprising the vinyl ether terminated urethane resin was recovered.

EXAMPLE IV

In this example, one equivalent of triethylene glycol monovinyl ether and 1 equivalent of free isocyanate, which was present in a diphenylmethane diisocyanate ether prepolymer in a toluene solvent, were stirred at room temperature under dry nitrogen in the presence of a catalyst comprising 0.05% dibutyltin dilaurate. After a period of 2 hours at room temperature, the solvent was removed under reduced pressure and the thick, clear liquid product was recovered.

EXAMPLE V

One equivalent of triethylene glycol monovinyl ether and one equivalent of free isocyanate present in a toluene diisocyanate ester prepolymer were reacted to form the desired resin. The reaction was effected by placing the solid prepolymer in a glass vial covered with aluminum foil. The vial was heated for a period of 20 minutes in an oven at 104° C. to melt the solid. The equivalent of triethylene glycol monovinyl ether was then stirred into the molten prepolymer along with 0.1% dibutyltin dilaurate. After an additional period of 1 hour while maintaining the temperature at 104° C., the high viscosity, clear liquid resin was recovered.

EXAMPLE VI

The vinyl ether terminated urethane resins which were prepared in Examples IIII V and V above were treated with a catalyst comprising 1% di-t-butyl-phenyliodonium hexafluoroantimony. The resins were then coated on a polyethylene-covered substrate and each sample was irradiated at 2.0 Mrads with a 160 KeV electron beam. Each of the samples cured to give tack-free flexible coatings.

EXAMPLE VII

In this example, the vinyl ether terminated urethane resin which was prepared according to Example II above was combined with 4% of a triarylsulfonium salt catalyst and coated in a thin layer on a polyethylene sheet. The sheet was suspended in a Rayonett Photochemical Reactor equipped with 350 nm lamps. After a 15 second exposure to the ultraviolet light in a nitrogen atmosphere, a tack free glossy coating was obtained.

EXAMPLE VIII

A series of vinyl ether terminated urethane resins were prepared by reacting different stoichiometric ratios of triethylene glycol monovinyl ether (TEGMVE), diphenylmethane diisocyanate (MDI), and trimethylol propane (TMP). In all cases a 1:1 ratio of hydroxy groups to isocyanate groups was maintained. The mixtures were stirred at room temperature in a solution of triethylene glycol divinyl ether (TEGDVE) under nitrogen in the presence of dibutyltin dilaurate. The viscosity of the resins and the molecular weight were determined. These results are set forth in Table I below:

TABLE 1

| Mole Ratio TEGMVE:MDI:TMP | | | Resin Viscosity (cps) | Molecular Weight | |
|---|---|---|---|---|---|
| | | | | No. Avg. | Wt. Avg. |
| 3 | 3 | 1 | 1,130 | 1,273 | 3,888 |
| 7 | 8 | 3 | 3,140 | 1,372 | 4,861 |
| 4 | 5 | 2 | 8,380 | 1,577 | 8,160 |

A catalyst comprising 3% of a triarylsulfonium salt was added to each of the three resins which were obtained according to the above paragraph. The mixtures were then each coated onto separate polyethylene sheets and irradiated with a 160 KeV electron beam. The coatings were all tack-free after a dose of 3.0 Mrad. When a catalyst comprising 1% of a diaryliodonium salt was used in place of the sulfonium salt, catalyst curing was obtained utilizing only a dose of 0.5 Mrad.

EXAMPLE IX

In this example, a vinyl ether terminated urethane resin was obtained by stirring a 2:1 mole ratio mixture of triethylene glycol monovinyl ether and dicyclohexylmethane 4,4'-diisocyanate under a dry nitrogen atmosphere in the presence of 0.05% dibutyltin dilaurate. At the end of 5 hours, the resulting product comprised a white, soft waxy solid which melted at about 4° C. to give a clear thick liquid. Gel permeation chromatography showed that the product consisted mostly of a simple 2:1 adduct.

A higher molecular weight resin was obtained by including triethylene glycol in the reaction mixture as a chain extender. The reaction was effected by treating a mixture of triethylene glycol, TEGMVE and the diisocyanate in a mole ratio of 2:2:1 vinyl ether to isocyanate to glycol. The resulting resin had an average molecular weight of 1,575 and was in the form of a low melting waxy solid.

The two resins which were prepared according to the above paragraphs were combined with a triarylsulfonium salt catalyst, coated onto polyethylene sheets and suspended in a Rayonett Photochemical Reactor equipped with 350 nm lamps. After a 30 second exposure to the ultraviolet light, tack-free clear glossy coatings were obtained.

To illustrate another method of curing, the resins were also combined with an iodonium salt catalyst and irradiated with 160 KeV electron beam. After a dose of 1.0 Mrad energy, again tack-free clear glossy coatings were obtained.

We claim as our invention:

1. A vinyl ether terminated urethane resin having the generic formula:

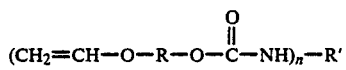

$$(CH_2=CH-O-R-O-\overset{O}{\underset{\|}{C}}-NH)_n-R'$$

in which R and R' are independently selected from the group consisting of alkyl, aryl, alkaryl, aralkyl, cycloalkyl and alkyl oxide radicals and n is an integer of from 1 to 4.

2. The vinyl ether terminated urethane resin as set forth in claim 1 in which said resin possesses a molecular weight in the range of from about 240 to about 10,000.

3. The vinyl ether terminated urethane resin as set forth in claim 1 in which R is methylene and R' is tolyl.

4. The vinyl ether terminated urethane resin as set forth in claim 1 in which R is ethylene and R' is tolyl.

5. The vinyl ether terminated urethane resin as set forth in claim 1 in which R is ethylene and R' is diphenyl-methylene.

6. The vinyl ether terminated urethane resin as set forth in claim 1 in which R is n-hexylene and R' is dicyclohexylmethylene.

7. The vinyl ether terminated urethane resin as set forth in claim 1 in which R is n-butylene and R' is tolyl.

8. A process for the preparation of a vinyl ether terminated urethane resin which comprises reacting the product obtained by the addition of acetylene to an organic polyol with an isocyanate-containing compound at reaction conditions, and recovering the resultant vinyl ether terminated urethane resin.

9. The process as set forth in claim 8 in which said reaction conditions include a temperature in the range of from about ambient to about 125° C. and about atmospheric pressure.

10. The process as set forth in claim 8 in which said reaction is effected in the presence of a tin-containing catalyst.

11. The process as set forth in claim 10 in which said tin-containing catalyst is dibutyltin dilaurate.

12. The process as set forth in claim 8 in which said organic polyol comprises triethylene glycol and said isocyanate containing compound comprises 2,4-toluene diisocyanate or a mixture of 2,4- and 2,6-toluene diisocyanate.

13. The process as set forth in claim 8 in which said organic polyol comprises triethylene glycol and said isocyanate compound is diphenylmethane diisocyanate.

14. The process as set forth in claim 8 in which said organic polyol comprises triethylene glycol and said isocyanate compound is dicyclohexylmethane diisocyanate.

15. The process as set forth in claim 8 in which said organic polyol comprises diethylene glycol and said isocyanate compound is 2,4-toluene diisocyanate or a mixture of 2,4- and 2,6-toluene diisocyanate.

16. The process as set forth in claim 8 in which said organic polyol comprises 1,6-hexanediol and said isocyanate compound is dicyclohexylmethane diisocyanate.

17. A polymeric material that results from curing a vinyl ether terminated resin having the generic formula:

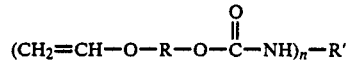

$$(CH_2=CH-O-R-O-\overset{O}{\underset{\|}{C}}-NH)_n-R'$$

in which R and R' are independently selected from the group consisting of alkyl, aryl, alkaryl, aralkyl, cycloalkyl and alkyl oxide radicals and n is an integer of from 1 to 4 which has been cured by a curing treatment at curing conditions.

18. The polymeric material as set forth in claim 17 in which said curing treatment comprises an irradiation of said resin from an electron beam.

19. The polymeric material as set forth in claim 18 in which the energy dosage from said electron beam is in a range of from about 0.1 to about 10.0 Mrads.

20. The polymeric material as set forth in claim 18 in which said irradiation is effected in the presence of an onium salt.

21. The polymeric material as set forth in claim 17 in which said curing treatment comprises exposure to an ultraviolet light source.

22. The polymeric material as set forth in claim 21 in which said exposure to said ultraviolet light source is effected in the presence of an aryl-onium salt.

23. The polymeric material as set forth in claim 17 in which said curing is effected by thermal treatment at an elevated temperature in the presence of an or acid organic an onium salt.

24. The polymeric material as set forth in claim 17 in which R is methylene and R' is tolyl.

25. The polymeric material as set forth in claim 17 in which R is ethylene and R' is tolyl.

26. The polymeric material as set forth in claim 17 in which R is ethylene and R' is diphenyl methyl.

27. The polymeric material as set forth in claim 17 in which R is n-hexylene and R' is dicyclohexylmethyl.

28. The polymeric material as set forth in claim 17 in which R is n-butylene and R' is tolyl.

29. A method for obtaining a tack-free coating which comprises subjecting a vinyl ether terminated urethane resin having the generic formula:

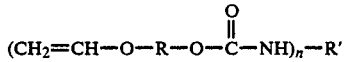

$$(CH_2=CH-O-R-O-\overset{O}{\underset{\|}{C}}-NH)_n-R'$$

in which R and R' are independently selected from the group consisting of alkyl, aryl, alkaryl, aralkyl, cycloalkyl and alkyl oxide radicals and n is an integer of from 1 to 4 to a curing treatment at curing conditions, and recovering the resultant tack-free coating.

30. The method as set forth in claim 29 in which said curing treatment comprises irradiation of said resin from an electron beam in which the energy dosage from said electron beam is in a range of from about 0.1 to about 10.0 Mrads in the presence of an onium salt.

31. The method as set forth in claim 29 in which said curing treatment comprises exposure to an ultraviolet light source in the presence of an aryl-onium salt.

32. The method as set forth in claim 29 in which said curing treatment is effected by a thermal treatment at an elevated temperature in the presence of an organic acid or an onium salt.

33. The vinyl ether terminated urethane resin of claim 1 in which R is 1,4-cyclohexane dimethanol.

34. The process of claim 8 in which said organic polyol comprises 1,4-cyclohexane dimethanol.

35. The polymeric material of claim 17 in which R is 1,4-cyclohexane dimethanol.

* * * * *